United States Patent [19]

Wright

[11] Patent Number: 4,972,074
[45] Date of Patent: Nov. 20, 1990

[54] OPTICAL ATTENUATOR MOVEMENT DETECTION SYSTEM

[75] Inventor: Scott M. Wright, 69 Lakewood Dr., Mineral City, Ohio 44656

[73] Assignee: Scott M. Wright, Mineral City, Ohio

[21] Appl. No.: 335,833

[22] Filed: Apr. 10, 1989

[51] Int. Cl.⁵ .............................................. H01J 5/16
[52] U.S. Cl. .......................... 250/227.11; 250/227.24; 250/221
[58] Field of Search .................. 250/227, 231 R, 221, 250/229, 551, 561, 227.11, 227.24; 350/96.2

[56] References Cited

U.S. PATENT DOCUMENTS

| | | | |
|---|---|---|---|
| 4,189,206 | 2/1980 | Terai et al. ........................... | 250/229 |
| 4,542,291 | 9/1985 | Zimmerman ........................ | 250/551 |
| 4,570,065 | 2/1986 | Pryor ................................... | 250/561 |
| 4,655,544 | 4/1987 | Galvin et al. ....................... | 350/96.2 |

Primary Examiner—Davis L. Willis
Assistant Examiner—Que Tan Le
Attorney, Agent, or Firm—Oldham & Oldham Co.

[57] ABSTRACT

An optical attenuation measurement system is provided for obtaining signals proportional to movement of a system to which it is attached. The measurement system includes a light source positioned within a length of conduit in which the light emitted will produce multiple reflections. A fiber optic cable is slidably disposed within the conduit to transmit the radiation emitted from the light source gathered thereby. The relative displacement of the fiber optic cable to the light source produces a signal as a function of this displacement which is converted into electrical signals by a light detecting element at the opposite end of the cable. The system is particularly useful to form an interactive device for control of a remote intelligent machine, robot or the like. For example, the system may be used on an operator's hand to detect movement of the hand and fingers for controlling a robotic hand which will mimick the operator's hand movements.

20 Claims, 4 Drawing Sheets

OPTICAL ATTENUATOR MOVEMENT DETECTION SYSTEM

BACKGROUND OF THE INVENTION

This invention relates generally to a measurement and control system utilizing optical attenuation to detect movement of a system to which it is attached. More specifically, the invention relates to an optical attenuation system and components thereof which will generate signals proportional to the movement of an article to which the system is attached. As an example, movement of a human hand may be detected so as to provide an interaction device which will generate signals proportional to hand and finger movements for control of a multi-degree-of-freedom robotic hand or the like.

Optical measurement systems are known and have been utilized in a wide variety of applications. Optical systems have been utilized particularly in the telecommunications industry, wherein an optical fiber is utilized as a communications link with a light signal being modulated to represent information which can then be detected and demodulated at the opposite end of the fiber for use. Optical systems have the unique ability to be introduced into hostile environments, particularly those having strong electromagnetic or electrostatic interference which may affect wiring, addressing, and signal processing aspects of a sensing, measuring or processing system. The optical system will not be adversely affected by such interference which may generate significant electric noise levels in electrical systems. In general, an optical system will include a source of light which may be introduced into an optical fiber and subsequently carried to a light sensor for converting the light signal into an electrical signal for use. The optical fibers utilized in such a system comprise a transparent core of suitable glass or plastic material which is carried within a relatively thin cylindrical cladding wherein the cladding has an index of refraction which is less than the refractive index of the core material. When a light signal is introduced into the optical fiber, the core material functions as a waveguide and will transmit or propagate the light signal with relatively small transmission losses, thereby enabling its effective use. The fiber optic cable will function reliably without undue attenuation of the light signals even if gradual turns or bends are introduced into the fiber.

It has been found in the prior art that relatively short bends in an optical fiber may significantly attenuate the light signals transmitted therethrough to enable use of an optical fiber in various measurement systems. Fiber optic systems have been developed for measuring mechanical motion or remote force measurements by introducing relatively short bends or what has been labeled the microbend effect inherent in fiber optic cables. The microbends introduced into a fiber optic cable result in the attenuation of the propagated light signal by scattering a portion of the signal from the fiber core to the cladding and/or to the surrounding environment.

Optical fiber microbending has been utilized to detract a portion of the light signal from a fiber optic cable or to input additional light signals into the fiber without damaging the fiber. One such system is shown in U.S. Pat. No. 4,253,727 showing a microbend coupler utilizing this phenomena. Alternatively, other uses for the concept of optical fiber micro bending are known. The technique may be utilized to measure displacement or force which would result in deformation of an optical fiber causing further attenuation which could be quantified to yield these measurements. One example of an optical sensor to monitor vibration or mechanical motion of equipment to which the sensor is attached is shown in U.S. Pat. No. 4,408,495. This phenomenon has also been utilized to determine the forces acting along a structure such as an oil or gas pipeline as shown in U.S. Pat. No. 4,477,725.

In these examples, the attenuation of the transmitted optical signal is determinative of the physical variable to be measured and must be of high sensitivity and include relatively complex signal processing means to measure fine variations in these variables. On the other hand, other optical systems may be responsive to alternative optical characteristics such as phase or polarization angle of the light source being transmitted through the fiber optic cable. A deformation sensor which may utilize other optical characteristics is shown in U.S. Pat. No. 4,420,251. It is recognized in such a system that the incident optical energy must be polarized by means of additional structure thereby adding complexity to the system.

Optical systems have also been utilized in other measurement systems such as an optical fiber based spectrometer utilized to determine the presence or absence of elements or the like in a sample or process being analyzed. The spectrometer measures the spectral radiance of light signals carried over a plurality of optical fibers at a distance from the sample being analyzed to avoid unwanted interference with measuring and processing apparatus. The spectrometer includes an optical attenuator which includes a plurality of eccentrically located apertures, the positions of which are variable. By suitably positioning the apertures on a fixed plane perpendicular to the emitted light rays, the desired amount of attenuation of light input from the optical fibers may be controlled by the misalignment of the optical fiber ends.

In yet another system as shown in U.S. Pat. No. 4,733,068, a fiber optic sensor array is utilized to form a tactile sensor utilized in manipulation activities for intelligent machines and robotics. The tactile sensor as described in this patent utilizes an array of transmitting and detecting optical fibers optically coupled to one another and sandwiched between a pliable spacer arrangement. As the supporting structure is deformed by an external force, the amount of light coupled into the detecting fiber from the transmitting fiber will vary according to the deformation. The changes in the received signals can then by processed to yield an indication of the deformation and thus the amount of force applied to the supporting structure. Control signals may be developed from this system and utilized as feedback so as to give an indication of the force at a remote location which may be especially useful in robotic applications.

It can thus be seen that optical systems have been utilized increasingly for various functions and provide an effective and accurate means by which physical variables may be measured. More recently, there has been found a need for interactive devices to facilitate communication between a user and a remote device such as an intelligent machine or robot. As robots become more of a integral portion of society, there is an increasing need for an effective interface between the user and the robot for control and manipulation of the robotic controls. For example, there have been developed electronic sensors which will register the head position and orientation of a user's head. Signals are developed to be interfaced with a remote robot to manipulate a robots camera eyes or the like in the same direction. Similarly, other interactive devices have been developed to interface with and control robotic functions such as a DataGlove developed by VPL Research, Inc., which translates hand and finger movements into electrical signals to control a remote robot. Such an interaction device enables the precision, control and agility of the human hand to be translated into robotic movements and manipulations enabling extremely effective control thereover. The DataGlove utilizes fiber optic cables sandwiched between two layers of cloth and formed into a glove which can be worn on the users hand. The fiber optic cables are run the length of each finger and thumb and doubled back upon themselves to be anchored at both ends to an interface board located in the base of the glove. Each fiber optic cable includes a light-emitting diode at one end and a phototransistor at the other.

In this system, the fiber optic cables are treated such that light will escape upon flexion movements of the hand of the user. Treating the fiber optic cables in this manner result in attenuation of the transmitted light signals. Alternatively, the treatment may also cause fatigue, deformation and eventual breakage. The phototransistor of the system will convert the light signals which it receives into electrical signals which can subsequently be input to a processing and control apparatus which will control the robotic movements. It should be recognized that the generation of signals proportional to the relatively complex movements of the human hand would enable complex maneuvers and manipulations of robotic apparatus to be carried out in both an easy and effective manner. It should also be recognized that such as system could be incorporated to include and take advantage of other human motions. This system requires complicated processing circuitry and is very costly to manufacture. Treating of the fiber optic cables may also result in reduced ability to form a repeatable and reliable system.

The translation of movements of the human hand have also been accomplished by a mechanical linkage device known as the Sarcose Hand Master developed by the A. D. Little Company. In this assembly, a mechanical linkage is associated with each finger and thumb on a human hand and includes electronic motion sensors which will transmit finger and thumb position information to be processed and utilized by a control system. The system may transduce up to sixteen joint angular positions and may also measure flexion and abduction or adduction. The electronic motion sensors require precise calibration as well as relatively complex processing or transformation and storage of the developed signals. It should be recognized that any mechanical design will inherently include limitations based upon the user and is somewhat cumbersome. Similarly, a mechanical design is subject to limited life and imprecise tuning and repetition of the system.

SUMMARY OF THE INVENTION

From the foregoing, it can be seen that there is a great need for an interactive device which is simple to construct and use and which does not require extensive or complex processing systems to produce control signals based upon an operators physical movements. Ideally, an interactive device for use with an interactive robotics system requires real-time control which is based upon complex maneuvers of an operators physiology, such as hand or finger movements. The control system must record the complex hand and finger movements and transfer these movements to a robotic hand or other intelligent machine such that the operator finger movements are mimicked in real-time.

The present invention provides a control system which is particularly useful in sensing human finger movements or the like used to control a multi-degree-of-freedom robotic hand which will mimic these movements in grasping and manipulative tasks. The control system utilizes an optical attenuator to overcome problems inherent in mechanical systems which may be cumbersome as well as temperamental due to an appreciable amount of mechanical resistance inherent in such systems. The optical attenuator comprises a light source positioned relative to an input end of a fiber optic cable for directing light along the fiber optic cable. The light source is positioned within a length of tubing or conduit in which the input end of the fiber optic cable is slidably positioned. The tubing or conduit in which the light source is positioned is preferably constructed of a material which will effectively reflect incident light rays from the light source. The reflections of the light inside the length of tubing play an important role in keeping the response linear across a range of relative movement of the input end of the fiber optic cable from the light source. The relative displacement of the input end of the fiber optic cable from the light source through a gap formed therebetween will act to attenuate the signals transmitted to the fiber optic cable thereby detecting relative movement therebetween and indicating the amount of such movement. In this system it is important that the relative movement of the fiber optic cable to the light source be accurately determined over a wide range of movement. The intensity of the light source or the physical properties of the fiber optic cable may be modified to effectively scatter or diffuse the light generated by the light source to linearize the system during displacement.

The output end of the fiber optic cable may then be coupled to a light detecting element sensitive to the wavelength of the light source. The light detecting means will thus determine the variance in light intensity transmitted through the fiber optic cable as a function of displacement of the input end of the cable relative to the light source. The light detecting means will generate signals proportional to the amount of light incident upon it which may subsequently be used to control a remote system as desired.

It should be recognized that the particular light source and light detecting means may be modified over a broad range of devices to generate desired control signals which are proportional to and a function of the motion detected using appropriate receiving circuitry.

It is therefore a main object of the invention to provide a movement detection system utilizing an optical attenuator to generate control signals proportional to detected movement utilizing the optical control system.

It is a further object of the invention to provide a movement detection system which may act as an active device for use in generating real-time control signals proportional to the detected movement and translating such movement to control an intelligent machine, robot or the like. The movement detection system may also be utilized as a device to generate feedback based upon the detected movement for monitoring or measuring such movement in a large variety of applications.

It is yet another object of the invention to provide a movement detection system which is both rugged and dependable and which is simple in its operation and construction. The control system is also uniquely designed to be extremely repeatable and accurate. The system provides a compact and lightweight system which may be used in remote and hostile environments.

It is still another object of the invention to provide a movement detection system which can be utilized in a large variety of situations and which can detect linear or rotational movement of a body or assembly to which it is attached. The system will generate control signals proportional to a detected movement which may be linear or intentionally shaped by means of interface circuitry and the type of detection means utilized in the system.

A further object of the invention is to provide electrical signals which can be processed by control circuitry to yield either analog or digital control signals.

Another object of the invention is to provide a movement detection system for the particular application of detecting human movement such as hand or finger movements to control a remote multi-degree-of-freedom robotic system which will mimic these movements in real-time. It is, of course, recognized that the potential of the movement detection system extends well beyond this particular application, and the movement detection system to be hereinafter described is merely one preferred embodiment thereof.

BRIEF DESCRIPTION OF THE DRAWINGS

Other features and advantages of the present invention will become apparent from the following detailed description, taken in conjunction with the accompanying drawings wherein.

DETAILED DESCRIPTION OF THE INVENTION

Figure 1:
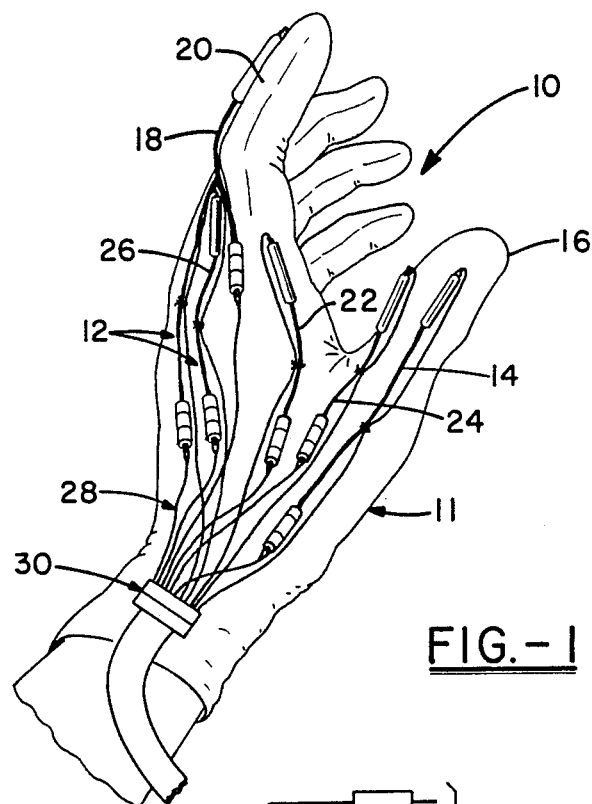
FIG. 1 is a perspective view of the optical movement detection system utilized in a particular application of detecting the movement of the fingers of a hand.

Turning now to the drawings, FIG. 1 represents the optical attenuator movement detection system associated with a hand 10 having a control glove 11 to be worn on an operators hand to detect both flexion and abduction/adduction movements of the fingers of the hand. A plurality of detection units 12 are situated in positions relative to the individual fingers and thumb of the hand 10 so as to effectively detect the individual movements thereof. For example, an individual optical sensing device 14 is positioned so as to extend from the base of the hand over the knuckle and substantially to the end of the thumb 16 on an upper portion thereof. In this position, the optical sensing device 14 will measure the flexion movement of the thumb 16 as it rotates into a grasping position. Similarly, a sensing device 18 positioned on the index finger 20 of the hand 10 may extend from a mid portion of the index finger 20 to the end thereof so as to monitor the movement from the outer joint of the index finger 18 to its tip. A second sensing device 22 may then be positioned from the base of the hand over the knuckle of the index finger 20 so as to measure flexion movement about the knuckle separately. It can be seen that a plurality of sensing devices may be utilized to monitor a variety of individual motions of each individual finger of the hand 10. There may also be provided a plurality of sensing devices such as shown at 24 and 26 which may be located on the side areas of the thumb or fingers of the hand to measure abduction/adduction type movements thereof.

Each of the sensing devices 12, which will be more particularly described hereinafter, comprise a light source positioned on the fingers of the hand 10 at the locations where movement is to be detected situated furthest from the base of the hand. The light source is housed in a length of conduit in which a fiber optic waveguide is also slidably positioned. The waveguide extends towards the base of the hand and is coupled to a light detecting element so as to measure the amount of radiation passing through the waveguide from the light source. The electrical signals generated by the light detecting element are then transmitted via wires 28 to an interface unit 30 for subsequent transmission to processing circuitry.

Figure 2:
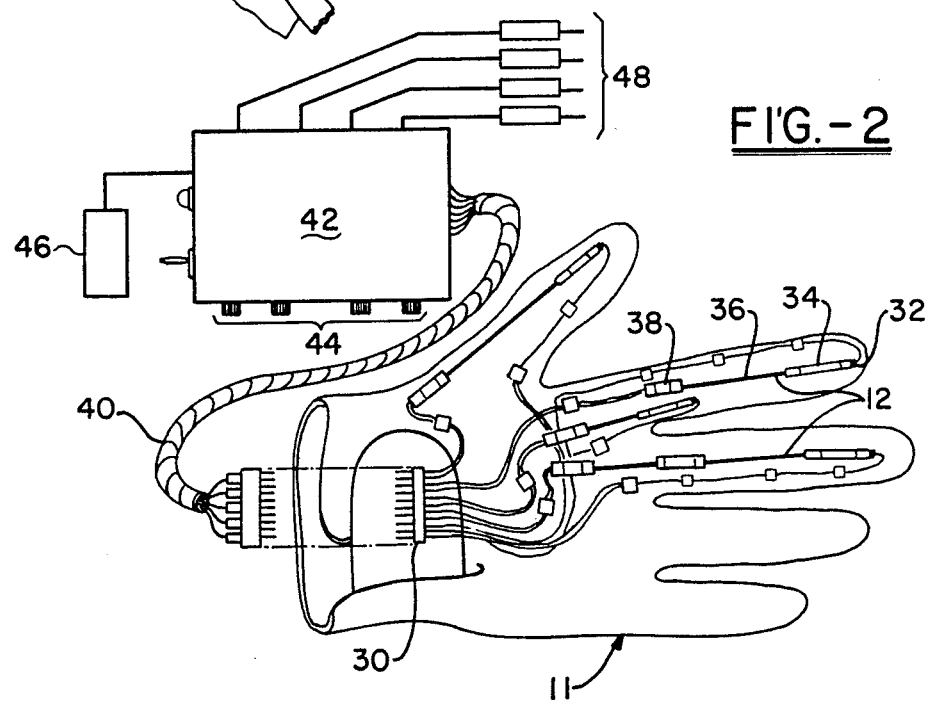
FIG. 2 is a top plan view of the movement detection system associated with a glove to be worn on the hand as shown in FIG. 1, and showing the coupling to an optical control system for processing of the data signals.

As seen in FIG. 2, the control glove 11 including the optical attenuator movement detection system may be provided to detect human finger movements to be used for control of a multi-degree-of-freedom robotic hand which will mimic these movements in real-time to perform grasping and manipulative tasks. The movement detection system includes a plurality of sensing devices 12, the particular number depending upon the type and complexity of the manipulated tasks to be performed. Relative to the embodiment shown in FIG. 1, the glove as shown in FIG. 2 comprises sensing devices 12 which measure only the flexion type movement of a pair of fingers and the thumb of the hand of an operator. It is easily recognized that additional sensing units 12 may be included to measure additional finger and thumb movements and to thereby increase the complexity of resulting robotic movements.

Each of the sensing devices 12 comprises a light source 32 housed in a length of conduit 34 and sealed so as to prevent external light from entering the conduit 34. A length of fiber optic cable 36 slidably engages the conduit 34 to receive the radiation emitted by the light source 32. The radiation received is proportional to the distance from the tip of the cable of the light source. The cable 36 will transmit this radiation to the light detecting means 38. Signals proportional to the magnitude of radiation transferred through the gap between the fiber optic cable 36 from the light source 32 will be transmitted to the interface unit 30 which also supplies power to the individual light sources 32. The developed signals which will be proportional to the movements of the fingers of an operator will be transferred via electric cables 40 to an optical control system 42 which includes adjustments 44 for each of the sensing devices as well as a power source 46 and additional circuitry to be hereinafter described. The optical control system will process the signals received from each of the sensing devices 12 to develop output signals transmitted over outputs 48 to control a remote intelligent machine, robot or the like.

The optical attenuator movement detection system used in conjunction with a control glove acts as an active device to generate real-time control signals proportional to detected movements so as to translate these movements to the control of intelligent machines, robots or the like. As an example, this particular application is designed to control a multi-degree-of-freedom robotic hand which may include what amounts to two mechanized fingers and a thumb. To use the hand in an interactive robotic system, the movement detection system affords real-time control which may be substituted for a joystick control of a conventional remote control transmitter assembly. In one known RC transmitter, a pulse modulation system is employed wherein joysticks physically turn 5K potentiometers for a plurality of channels which in turn control the position of servo-mechanisms associated with the fingers of the robotic hand.

The control glove as described with reference to FIGS. 1 and 2 is utilized to replace joystick control units of the RC transmitter. The resistance characteristics on one-half of the control potentiometers were substituted with the fiber optic control system to provide similar position/resistance relationships to affect control of the robotic hand. The complex movements detected by the movement detection system of the invention enable control of a dexterous robotic hand in a much more effective and complex manner than that enabled by use of joystick control.

Figure 3:
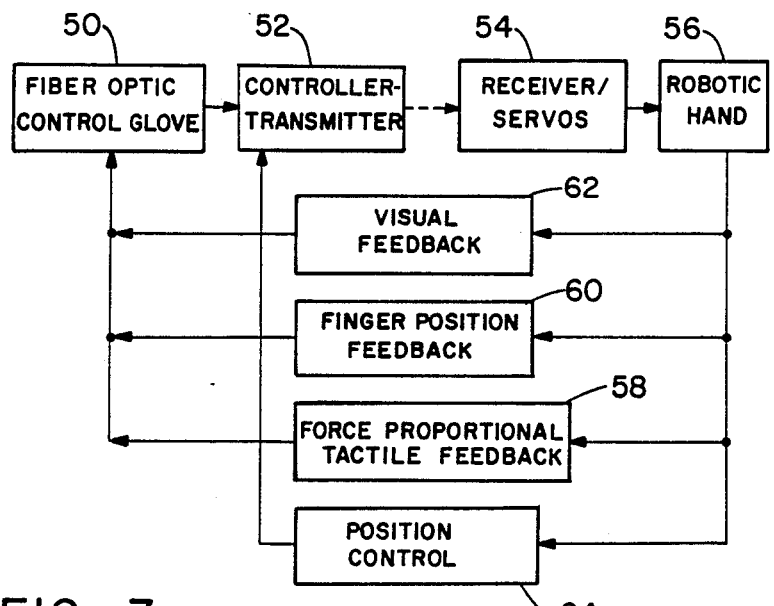
FIG. 3 is a block diagram of one type of system in which the optical attenuator movement detection system may be utilized.

For complete control of the dexterous robotic hand, other systems may be necessary which will be understood with reference to FIG. 3. In this system, the fiber optic control glove will develop signals relative to the motion of an operators hand as previously described in 50. The developed signals will be processed by the optical controller 52 and will take place of a joystick control on a RC transmitter. At a remote location, the transmitted signals proportional to the hand movements of an operator will be received so as to control the servomechanisms associated with a robotic hand at 54 and 56 to affect real-time control thereover. The robotic hand may include force proportional tactile feedback information at 58 from sensors positioned on the robotic hand 56. These feedback signals may be provided to simulate a sense of touch on the finger of the operator at the remote location by transducers placed in the control glove.

Additional feedback mechanisms such as finger position feedback 60 as well as visual feedback 62 inherent to the operator will facilitate control of the robotic hand by the operator. Additionally, a position control means 64 may be provided to sense the absolute position and orientation of the operators hand or of the robotic hand for proper control in certain applications. It should be seen that such a system provides an extraordinarily sensitive link between operator and robot with several levels of feedback to effect human-robotic interaction. Applications of such a system include hazardous tasks that require human dexterity and intellect such as the handling of pathogenic or toxic substances, tasks that involve high radiation levels as well as work in hostile environments such as space and deep sea.

Figure 4:
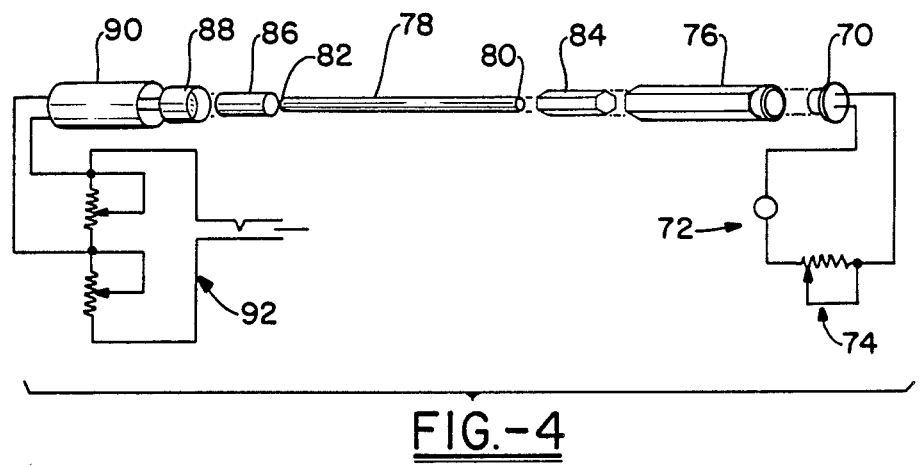
FIG. 4 is an exploded view of the optical attenuation movement detection system showing the individual elements thereof in the preferred embodiment.

Turning now to FIG. 4, the optical attenuator movement detection system is shown more distinctly. The detection system comprises a light source 70 which may be a conventional LED having a predetermined wavelength of emitted light. The LED 70 is driven by a voltage source 72, and may be adjusted to emit the desired intensity by a potentiometer 74. The LED 70 is positioned so as to emit light into a length of tubing or conduit 76 which may be constructed of brass or any other material which will produce reflection of the emitted light from the LED 70 within the conduit 76. The LED 70 is appropriately sealed at the end of the conduit 76 so as to prevent external light from entering the conduit at this location. At the other end of the tube 76 there is provided a fiber optical cable 78 which may be of any desired length having an entrance end 80 and an exit end 82 for transmitting captured radiation. At the entrance end 80 of the fiber optic cable 78 there is positioned a short length of tubing or conduit 84 placed around the external surface of the fiber optic cable 78. The conduit portion 84 is designed to be slidably engaged within the length of conduit 76 to enable relative movement between the fiber optic cable 78 to the LED 70 in of conduit 76. The conduit portion 84 slides easily within the conduit 76 but is also closely fit to prevent external light from entering the conduit 76. The portion 84 also acts to positively align the fiber optic cable 78 with the LED 70 throughout relative movement. It should be recognized that if desired the conduit portion 84 may also be provided with a sealing means to totally prevent external light and atmosphere from entering the conduit 76, but should always remain slidable therein. There may also be provided a flexible sleeve which will encompass the entire system to prevent light or atmosphere from contaminating it.

It can be seen from reference to FIG. 4, that with the entrance end 80 and conduit portion 84 inserted into the end of the conduit 76 which may have any desired length, the radiation emitted from the LED 70 will travel to the fiber optic cable 78 through the air gap formed within the conduit 76. As the fiber optic cable 78 slides relative to the conduit 76, the length of the air gap will accordingly decrease or increase. As the distance increases from the LED 70, the intensity of light which reaches and is transmitted through the length of the fiber optic cable 78 is reduced. Normally, the attenuation of the radiation from the light source to the fiber optic cable will vary as a function of the square of the distance therebetween. In the optical attenuator of the present invention, the reflections created in the conduit 76 act to compensate for this change of radiation over distance to some degree so as to maintain the amount of light which reaches the fiber optic cable, and to thereby yield and an effective measurement system. This aspect of the invention will be described in more detail hereinafter.

Figure 5A:
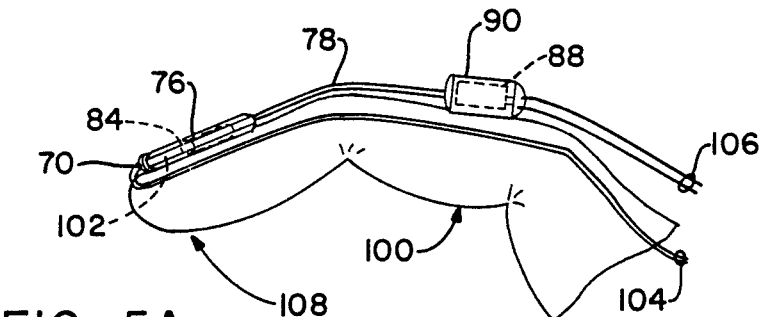
FIGS. 5a and 5b show the operation of the movement detection system in association with relative movement of a finger to which the system is attached.
Figure 5B:
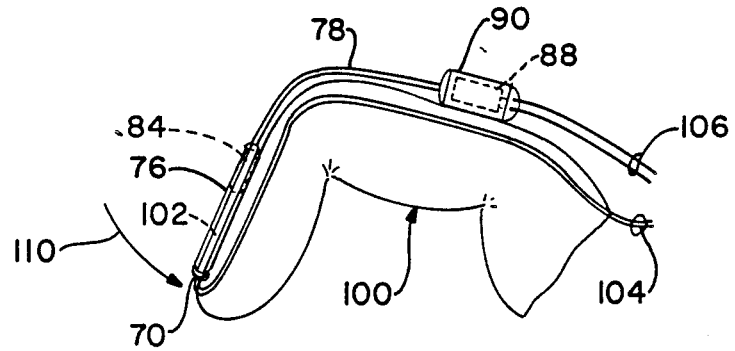

At the exit end 82 of the fiber optic cable 78 there may also be positioned a conduit portion 86 for rigidity of the system which may not be necessary in some applications. The detecting means 88 is provided at the exit end 82 of the fiber optic cable 78 so as to capture the radiation propagated therethrough. The detecting means may be a photoresistor as shown in FIG. 4 or any alternative light detecting means which are conventionally available and known in the art. The detecting means 88 will transform the detected radiation levels into electrical signals which are processed by an optical control system for use. Another length of conduit 90 may be provided to house the detecting means 88 to form a rigid and durable construction. The light detecting means 88 may be sealed within the housing 90 to prevent external light from entering the detection system. Circuitry 92 is provided to process the signals received from the detecting means 88, and may comprise a resistor network consisting of two potentiometers to adjust the ramp and offset of resistive output from a photo resistor as a function of movement in one example. As seen in FIGS. 5a and 5b a functioning of the optical attenuator is shown as used to measure movement of a finger of an operator. In FIG. 5a, the LED source 70 and length of conduit 76 are positioned at the tip of the finger 100 and secured thereto. The length of fiber optic cable 78 is positioned such that the conduit portion 84 extends inside the conduit 76 to a position relative to the LED 70. An air gap 102 is thereby formed between the entrance end of the fiber optic cable 78 and the LED 70. At the exit end of the fiber optic cable 78 is positioned the light detecting means 88 within housing 90. The LED 70 is coupled by means of wires 104 to the power source and the light detecting means 88 will transmit information to the processing means by wires 106.

It should be recognized that as the finger 100 of the operator moves to a straightened position as shown by arrow 108, the air gap 102 will be shortened and the attenuation of light signals transmitted from the LED 70 will decrease. Alternatively, as seen in FIG. 5b, as the finger 100 of the operator is moved in a direction as shown by arrow 110, the air gap 102 will increase and the light emitted by the LED 70 will be attenuated to a greater extent. In this way, movement around a subtended arc formed at the joint of the finger 100 over which the detection system is placed is effectively measured. The change in distance between the LED 70 and the entrance end of the fiber optic cable 78, as the cable and conduit portion 84 slide within the conduit 76 during movement yield signals proportional thereto. It is this phenomenon which enables accurate measurements of finger movement which may then be translated into mimicked movement of a robotic hand or the like. As mentioned previously, the detection system may be placed so as to measure movement around any joint or other area of the hand or other body portion. Similarly, the detection system may measure linear movement on a straight line portion or may be positioned in a manner to measure rotational movement such as relative rotation between the hand and forearm about the wrist. It should also be recognized that the utilization on a human operator is only one application for the detection system, and a wide variety of other uses are envisioned. In effect, the movement detection system of the invention may be used to measure the position (distance or subtended arc) of one point to another on a flat, curved or irregular surface, or to measure the relative position of one part of a human body to another to form active measurement systems which may be used to control intelligent machines, robots or the like in real-time. Alternatively, the measurement system may be used as a position controlling device or position measuring device to measure relative movement on any type of assembly to yield feedback or quantifiable verification of movement.

In one example of the optical attenuator movement detection system, the light source 70 as shown in FIG. 4 may be a conventional LED with a diffused lens transmitting light at a wavelength of 660 nm. Light emitted from the LED and conveyed through the air gap to the fiber optic cable 78 is then propagated to the light detecting means 88 which may be a cadmium selenium photoresistor closely matched to the wavelength of the LED. Optic cable 78 should have a diameter to capture a sufficient amount of light to maintain signal strength and to provide rigidity to the system.

Although this particular configuration yields accurate and repeatable results, it is recognized that a wide variety of light source/detector pairs may be utilized with the concept of the invention. For example, LED's having different wavelengths, incadescent lamps, or lasers could be used to form the movement detection system. It is also recognized that the type of light detecting means can similarly vary over a wide range such that any light detecting device sensitive to the wavelength of the emitting source and which is physically constructed such that the light transmitted through the fiber optic cable can be directed on it. For example, cadmium sulfide or other photoresistive cells may be selected with various electrical characteristics, and the response parameters coupled to an appropriate interface circuit. Similarly, a phototransistor or other photosensitive device with appropriate circuitry may be used to provide voltage or current output response as a function of position. It should be recognized that a pulsed light input may be provided to generate a position controlled amplitude modulated sampling train which may be useful for digital systems.

With alternative light source/detecting means the electrical interface circuitry will vary accordingly to produce desired output signals as a function of motion. For example, with photoconductive cells, there may be provided resistive networks, bridge circuits, or control circuits of an amplifier or other electronic interface circuitry as desired. Similarly, with phototransistors, the control circuit may include semi-conductors or other electronic devices to provide the appropriate response as a function of a position. Thus, the entire system may generate signals as a change of resistance for analog control as with the LED/photoresistor pair, or alternatively may generate current or voltage signals proportional to movement which may be then digitized to drive computer or other appropriate electronic control circuitry. By digitizing voltage or current signals, the system may then include complex processing means to transform or shape the output as desired. For example, the abduction/adduction sensors used on an operators hand may pick up flexion motion also. To compensate for this, the flexion and abduction/adduction signals could be input into a Wheatstone bridge circuits and fed to differential amplifiers where the flexion signals can be subtracted out at a summing amplifier to yield signals proportional to the abduction/adduction movement only which can then be digitized if desired.

In this way, more complex user systems may then be handled in real-time to measure 3-D motion.

Figure 6:
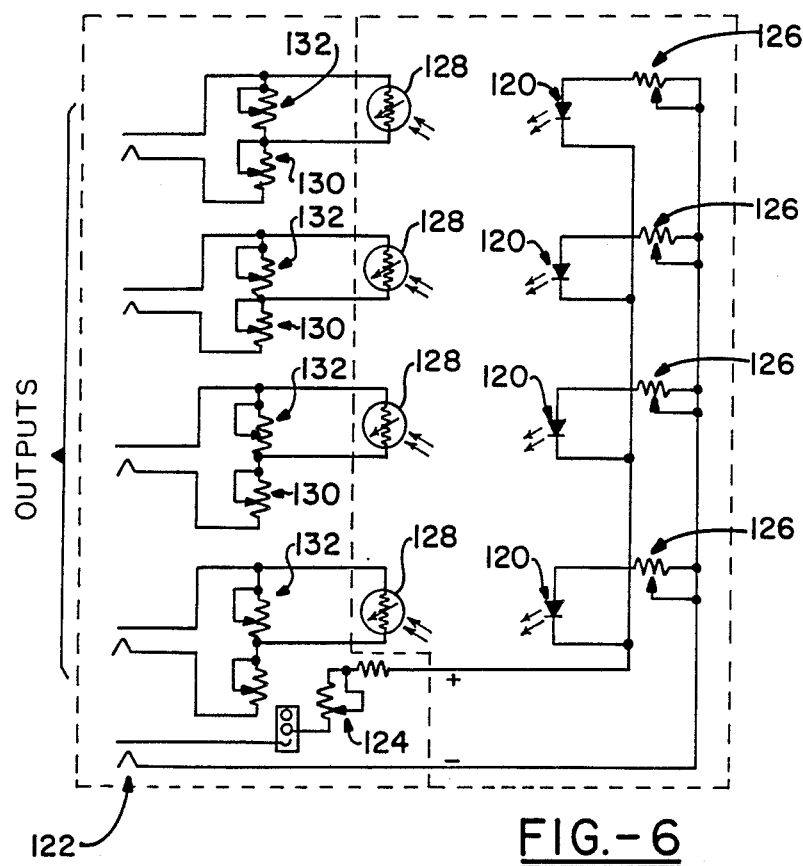
FIG. 6 is schematic circuit diagram of one type of optical control system which may be utilized with the detection system.

One example of interface circuitry which may be utilized is shown in FIG. 6 for the LED/photoresistor pair previously described. This system provides a very simple, low-cost package, but still yields accurate and repeatable results. The optical control system as shown in FIG. 6 for use with a system as shown in FIG. 2 comprises a plurality of LED light sources 120 such as galium arsenide type LED's having a wavelength of 665 nm which are coupled to a power source at 122 having a control potentiometer 124. Each of the individual LED's 120 may include a fine adjustment potentiometer 126 associated therewith. A detecting means 128, which may be a cadmium selenium photoresistor, receives the emitted light from the LED's 120. The photoresistors 128 are coupled to control circuitry consisting of a resistor network of two potentiometers. The two potentiometers include one potentiometer wired in series at 130 which serves as an offset adjustment for the output. Another potentiometer 132 is wired in parallel and serves as a ramp adjustment for the output signals. The optical control circuitry will form resistive outputs as a function of movement for each of the joint movement of an operators hand, such as shown in FIG. 2.

Figure 7:
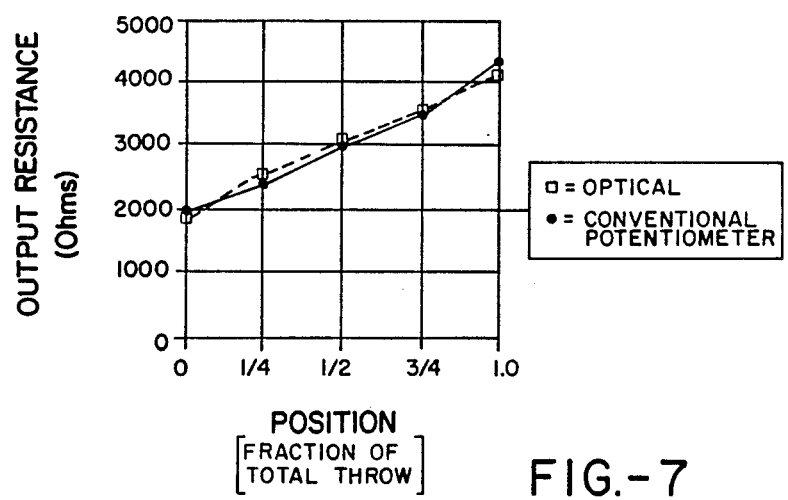
FIG. 7 is a graph showing the relationship of resistance verses position of the optical movement detection system relative to a conventional control potentiometer of a remote control transmitter.

The graph of FIG. 7 shows the output of an optical attenuator movement detection system as described with reference to FIG. 6 as a function of position. As shown in FIG. 7, the optical attenuator output is shown as compared to the output of a conventional potentiometer which may be used in a conventional RC transmitter. It is noted that the optical output is extremely linear over the entire range of position and may be effectively substituted into the RC transmitter for remote control of an intelligent machine, robot or the like.

Figure 8:
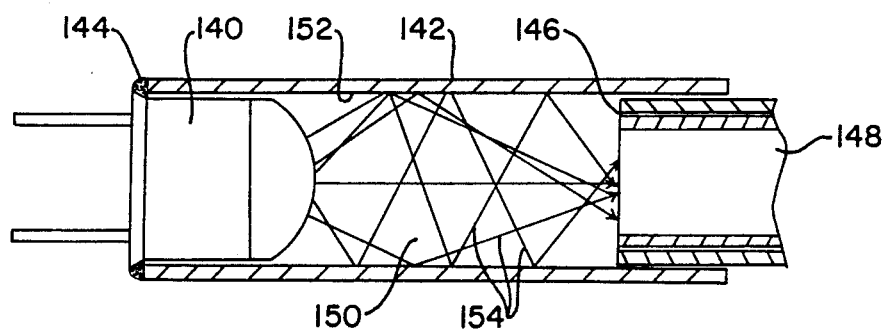
FIG. 8 is an enlarged sectional view taken through a conduit in which the light source of the detection system is mounted showing the effective scatter of the light signals of the light source as well as the multiplicity of reflections within the conduit leading to a linearized output.

Turning now to FIG. 8, an enlarged view of the light source in the transmitting unit of the invention is shown. A LED 140 is positioned inside a length of conduit 142 and may be sealed therewith by an opaque epoxy 144 or any other suitable means in such a way as to prevent external light from entering the conduit 142. The entrance end 146 of a length of fiber optic cable 148 is slidably disposed in the length of conduit 142 so as to form a gap 150 which simply may be air or another type of fluid. The fiber optic cable 148 slides relative to the conduit 142 to vary the distance between the LED 140 and the entrance end 146 of the cable. As mentioned previously, it may be desired to modify the natural attenuation of light reaching the entrance end of the fiber optic cable 148 from the LED 140 as the relative distance therebetween varies. The inside surface 152 of the conduit 142 may thus be a reflective surface to produce multiple reflections 154 of the emitted radiation from the LED 140 which are additive to the direct radiation falling on the entrance end 146 of the fiber optic cable 148, so as to linearize the subsequent output of the optical attenuator system.

In effect, the amount of radiation falling on the entrance 146 of the fiber optic cable 148 emitted by diffused the LED 140 is enhanced by the multiple reflections created by means of the reflective surface 152 of the conduit 142. Thus, when a diffused light source such as many conventional LED's, Fresnel lenses or the like are used as the light source, the output of the detection system will be extremely linear as seen in FIG. 7. In some situations, a less diffused light source may be desirable to give certain optical characteristics for control of the output. For example, with reference to FIG. 2, the sensing device 12 positioned at the outermost joint of the index finger has limited movement associated therewith. Under these circumstances, it is desired to provide greater output for small relative movement between the light source and the entrance end of the fiber optic cable. This may be accomplished by grinding the conventional LED to emit more of a point but still somewhat diffused source of radiation or by other enhancements. An alternative light source such as a laser may also be utilized in the system and may yield a linear output by the use of a diffusion grating or the like to gain the desired optical characteristics. It is also recognized that the output control system may include appropriate circuitry to shape a proper response.

The optical attenuator movement detection system of this invention thus provides a practical and effective optical arrangement to obtain accurate and repeatable measurements in a large variety of applications. The measurement system disclosed comprises a simple, cost effective device for active or passive measurement applications. Various modifications and improvements to the invention described herein are believed to be apparent to one skilled in the art, such as modification of the light source means, light detecting means or control circuitry as desired. Although the invention has been discussed in detail with respect to certain preferred embodiments, various modifications and additions may be made to the invention without departing form the spirit and scope of the invention as defined in the appended claims.

What is claimed is:

1. An optical detection system comprising:
   a light emitting means positioned in a length of conduit so as to emit light into said conduit,
   a light transmission means having a first end slidably positioned in said conduit to receive light emitted by said light emitting means,
   a light detecting means coupled to a second end of said light transmission means to receive light propagated through said light transmission means,
   wherein the relative longitudinal distance between said light emitting means and said first end of said light transmission means varies within said conduit to yield an indication of the variable to be detected.

2. An optical detection system as in claim 1, wherein, said light emitting means is a LED having a predetermined wavelength of emitted light, and said light detecting means is substantially matched to said wavelength.

3. An optical detection system as in claim 1, wherein, said light detecting means is a photoresistor outputting variable resistance proportional to the amount of light incident upon it.

4. An optical detection system as in claim 1, wherein, said conduit has an inner reflective surface to produce multiple reflections of light emitted from said light emitting means and incident upon said inner surface thereby linearizing the output of the system with variation of said relative distance between said light emitting means and said light transmission means.

5. An optical detection system as in claim 4, wherein, light from said light emitting means is diffused so as to be directed in part toward said inner reflective surface of said conduit.

6. An optical detection system as in claim 1, wherein, said light transmission means is a length of fiber optic cable.

7. An optical detection system as in claim 6, wherein,
said fiber optic cable includes a second conduit portion at said first end which is inserted into said conduit, said second conduit portion facilitating sliding of said first end in said conduit and maintaining alignment of said cable within said conduit.

8. An optical detection system as in claim 7, wherein,
said second conduit portion fits closely with said conduit to prevent any appreciable amount of external light from entering said conduit.

9. An optical detection system as in claim 1, wherein,
said light emitting means is sealed within said conduit to prevent external light from entering said conduit, and said light detecting means is sealed with said second end of said light transmission means to prevent entrance of external light incident upon said light detecting means.

10. An optical detection system as in claim 1, wherein,
said conduit is secured to a system, the movement of which is to be measured,
said second end of said light transmission means is secured to said system such that movement of said system results in relative movement between said first end of said light transmission means and said light emitting means positioned within said conduit.

11. An optical detection system as in claim 10, wherein,
said relative movement results in changing the length of a gap formed between said first end of said light transmission means and said light emitting means thereby varying the amount of light reaching said light transmission means from said light emitting means as a function of the variable to be measured.

12. An optical detection system as in claim 10, wherein,
said system is a finger of a human operator such that movement of said finger will generate signals from said light detecting means proportional to finger movement to control an intelligent machine, robot or the like.

13. An optical detection system as in claim 12, wherein,
said movement of said finger is flexion, abduction or adduction and the distance around a subtended arc at a joint of said finger or a linear distance may be measured during movement of said finger.

14. An optical detection system as in claim 1, further comprising,
an optical control system for processing signals received from said light detecting means to develop control signals proportional to a variable to be measured.

15. An optical detection system as in claim 14, wherein,
said optical control system comprises a resistive network having a plurality of potentiometers to control the ramp and offset of said signals received from said light detecting means.

16. An optical detection system as in claim 14, wherein,
said optical control system comprises a bridge circuit coupled to a differential amplifier to boost and shape signals received from said light detecting means.

17. An optical detection system as in claim 1, wherein,
signals received from said light detecting means may be voltage, current or resistance signals which are transmitted to an optical control system for processing of said signals to develop control signals for the control of an intelligent machine, robot or the like.

18. An optical detection system as in claim 17, wherein,
said signals received from said light detecting means are digitized and interfaced with compatible control systems.

19. An optical detection system as in claim 1, wherein,
said conduit is effectively sealed by means to prevent the ingress of the outside atmosphere.

20. A detection system to measure movement of a system to which is attached comprising:
light emitting means;
light detecting means;
light coupling means having first and second ends between said light detecting means for propagating light from said light emitting means to said light detecting means;
a length of conduit attached to the system having said light emitting means disposed therein so as to emit light into said conduit,
said first end of said light coupling means being slidably positioned in said conduit to receive the emitted light from said light emitting means, wherein the longitudinal distance between said light emitting means and said first end of said light coupling means varies within said conduit with movement of the system acting to vary the amount of light reaching said light detecting means through said light coupling means as a function of the variable to be measured.

* * * * *